(12) United States Patent
Akolkar et al.

(10) Patent No.: US 10,083,242 B2
(45) Date of Patent: *Sep. 25, 2018

(54) SYSTEM AND METHOD FOR DATA-DRIVEN WEB PAGE NAVIGATION CONTROL

(71) Applicant: INTERNATIONAL BUSINESS MACHINES CORPORATION, Armonk, NY (US)

(72) Inventors: Rahul P. Akolkar, Tuckahoe, NY (US); John M. Boyer, Victoria (CA); Charles F. Wiecha, Hastings on Hudson, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 118 days.

This patent is subject to a terminal disclaimer.

(21) Appl. No.: 15/233,884

(22) Filed: Aug. 10, 2016

(65) Prior Publication Data

US 2016/0350435 A1 Dec. 1, 2016

Related U.S. Application Data

(63) Continuation of application No. 14/042,969, filed on Oct. 1, 2013, now Pat. No. 9,471,204, which is a
(Continued)

(51) Int. Cl.
*G06F 17/00* (2006.01)
*G06F 17/30* (2006.01)
(Continued)

(52) U.S. Cl.
CPC ...... *G06F 17/30873* (2013.01); *G06F 3/0484* (2013.01); *G06F 17/2247* (2013.01); *G06F 17/243* (2013.01)

(58) Field of Classification Search
CPC .................................. G06F 17/30873
See application file for complete search history.

(56) References Cited

U.S. PATENT DOCUMENTS

| | | |
|---|---|---|
| 5,195,172 A | 3/1993 | Elad et al. |
| 5,835,683 A | 11/1998 | Corella et al. |
| (Continued) | | |

OTHER PUBLICATIONS

Wang, May, et al, "Web Structure Reorganization to Improve Web Navigation Efficiency", 11th Pacific-Asia Conference on Information Systems, 2007, pp. 411-422. (Year: 2007).*
(Continued)

*Primary Examiner* — Laurie Anne Ries
(74) *Attorney, Agent, or Firm* — Tutunjian & Bitetto, P.C.; Rabin Bhattacharya

(57) ABSTRACT

A system and method for web application navigation control includes updating navigation data models used in navigation constraints with received data from an end-user or system. Without needing a centralized application-specific controller, from a collection of extensible navigation rules associated with each page of a plurality of pages, the extensible navigation rules are automatically selected which depend on changed data values and need re-evaluation. The navigation constraints associated only with the pages potentially changing their ready state to execute from among the plurality of pages in an entire application are evaluated to determine which pages are ready to run based on updated data from the navigation data models. A preferred page to be actually navigated to next is selected from among a set of all available and ready pages by execution of a set of second and separate navigation constraints using results of the navigation constraints of the evaluating step.

20 Claims, 9 Drawing Sheets

Related U.S. Application Data continuation of application No. 13/602,989, filed on Sep. 4, 2012, now abandoned, which is a continuation of application No. 12/847,484, filed on Jul. 30, 2010.

(51) Int. Cl.
*G06F 3/0484* (2013.01)
*G06F 17/22* (2006.01)
*G06F 17/24* (2006.01)

(56) References Cited

U.S. PATENT DOCUMENTS

| | | | | |
|---|---|---|---|---|
| 5,870,727 | A * | 2/1999 | St. Jacques | G06F 9/4443 706/11 |
| 6,339,832 | B1 * | 1/2002 | Bowman-Amuah | G06F 9/542 710/266 |
| 6,671,692 | B1 * | 12/2003 | Marpe | G06F 17/30873 |
| 6,803,926 | B1 * | 10/2004 | Lamb | G06Q 20/201 705/20 |
| 6,871,213 | B1 * | 3/2005 | Graham | G06F 17/30873 707/E17.111 |
| 6,996,800 | B2 | 2/2006 | Lucassen et al. | |
| 7,029,306 | B2 | 4/2006 | Boloker et al. | |
| 7,051,119 | B2 * | 5/2006 | Shafron | G06F 17/30873 709/203 |
| 7,107,535 | B2 * | 9/2006 | Cohen | G06F 17/3089 707/E17.116 |
| 2002/0049788 | A1 * | 4/2002 | Lipkin | G06F 17/30893 715/236 |
| 2003/0058277 | A1 * | 3/2003 | Bowman-Amuah | G06F 17/30607 715/765 |
| 2004/0103426 | A1 * | 5/2004 | Ludvig | H04H 20/86 725/9 |
| 2005/0172018 | A1 * | 8/2005 | Devine | G06F 11/0709 709/223 |
| 2006/0085766 | A1 * | 4/2006 | Dominowska | G06F 17/30873 715/854 |
| 2006/0161646 | A1 | 7/2006 | Chene et al. | |
| 2007/0180380 | A1 * | 8/2007 | Khavari | G06F 17/243 715/704 |
| 2007/0220079 | A1 | 9/2007 | Chandrasekharan et al. | |
| 2008/0126925 | A1 | 5/2008 | Haven et al. | |
| 2008/0162529 | A1 | 7/2008 | Stuhec | |
| 2008/0222179 | A1 | 9/2008 | Greene et al. | |
| 2008/0312814 | A1 * | 12/2008 | Broadbent | G01C 21/3611 701/532 |
| 2009/0119334 | A1 | 5/2009 | Ahern et al. | |
| 2009/0265686 | A1 | 10/2009 | Lucas et al. | |
| 2010/0265136 | A1 * | 10/2010 | Trautenberg | G01S 19/02 342/357.395 |

OTHER PUBLICATIONS

Zhang, Xinyong, et al, "CATER: A Framework for the Automated Layout of Transactional Pages," Proceedings of the Sixth IEEE International Conference on Computer and Information Technology (CIT '06), 2006, pp. 1-6. (Year: 2006).*

Agha, G., et al. "A Foundation for Actor Computation"; J. Functional Programming 1 (1):1-000, Jan. 1993. (59 pages).

Berry, G., et al. "The Esterel Synchronous Programming Language: Design, Semantics, Implementation", Science of Computer Programming. vol. 19, No. 2, Nov. 1992. (51 pages).

Bonner, A. "Workflow, Transactions and Datalog"; Proceeding of the 18th ACM Symposium on Principles of Database Systems (PODS) May-Jun. 1999, (67 pages).

Boyer, J., et al. "XFORMS 1.0 (Second Edition)" W3C Recommendation, Mar. 2006. (126 pages) http:www.w3.org/TR/xforms/index-all.html.

Bray, T., et al. "Extensible Markup Language (XML) 1.0 (Fourth Edition)" W3C Recommendation, Aug. 2006, (42 pages) http://www.w3.org/TR/2006/REC-xml-20060816.

Caspi, P., et al. "LUSTRE: A Declarative Language for Programming Synchronous Systems", Conference Record of the Fourteenth Annual ACM Symposium on Principles of Programming Languages. Jan. 1987. (11 pages).

Clark, J., et al. "XML Path Language (XPath) Version 1.0" W3C Recommendation. Nov. 1999. (33 pages) http://www.w3.org/TR/1999/REC-xpath-19991116.

Cooper, E., et al. "Links: Web Programming Without Tiers", Formal Methods for Components and Objects, 5th International Symposium, FMCO 2006. Nov. 2006. pp. 1-12.

Dong, G., et al. "Nonrecursive Incremental Evaluation of Datalog Queries", Annals of Mathematics and Artificial Intelligence, vol. 14, Nos. 2-4, 1995, pp. 1-33.

Fielding, R. "Architectural Styles and the Design of Network-Based Software Architectures", PhD thesis, University of California, 2020. (180 pages).

Flapjax. "Flapjax Tutorial" Copyright 2006. Printed May 2007. (10 pages) http://www.flapjax-lang.org/tutorial/.

Halbwachs, N., et al. "A Tutorial of LUSTRE", This Document is an introduction to the language LUSTRE-V4; Jan. 2002. pp. 1-26. www-verimag.imag.fr/~halbwach/PS/tutorial.ps.

Harel, D., et al. "Statemate: A Working Environment for the Development of Complex Reactive Systems"; Proceedings, 10th International Conference on Software Engineering. Apr. 1988. pp. 395-406.

Harris, T., et al. "Composable Memory Transactions: Post-Publication Version"PPoPP '05, Aug. 2006. pp. 1-13.

Houssais, B. "The Synchronous Programming Language Signal a Tutorial", IRISA. Espresso Project. Apr. 2002, (48 pages).

Kiczales, G., et al. "Aspect-Oriented Programming" ACM Computing Surveys. vol. 28 , Issue 4, Dec. 1996. (14 pages).

Liu, M. "Extending Datalog With Declarative Updates", Journal of Intelligent Information Systems. vol. 20, No. 2, Mar. 2003. (23 pages).

Manola, F., et al. "RDF Primer" W3C Recommendation. Feb. 2004. (78 pages) http://www.w3.org/TR/2004/REC-rdf-primer-20040210/.

Milner, R., et al. "A Calculus of Mobile Processes, Part I", Information and Computation 100 Jun. 1989. (46 pages).

Milner, R., et al. "A Calculus of Mobile Processes, Part II", Information and Computation 100, Jun. 1989, (41 pages).

Paton, N., et al. "Active Database Systems", ACM Computing Surveys (CSUR). vol. 31 , Issue 1. Mar. 1999. (47 pages).

Topor, R. "Safe Database Queries With Arithmetic Relations" Proceedings of the14th Australian Computer Science Conference. Feb. 1991. pp. 1-12.

Wang, X. "Negation in Logic and Deductive Databases", PhD Thesis; University of Leeds. Sep. 1999. (180 pages).

* cited by examiner

SYSTEM AND METHOD FOR DATA-DRIVEN WEB PAGE NAVIGATION CONTROL

BACKGROUND

Technical Field

The present invention relates to web page navigation control and more particularly to a system and method for automatically providing navigation through pages based on a position and/or content of data known or entered into a web form or page.

Description of the Related Art

Complexities result from a lack of integrated document packaging for current document formats which represent composite forms in collaborative business processes. Underlying document formats that flow through business processes typically are existing formats such as PDF, DOC, HTML, or various proprietary XML formats. Proprietary, or vendor-centric, formats are not suitable representations for complex composite forms due to the closed nature of their formats. Complex forms require new or extended representations for issues such as data sharing across document fragments, transfer of control among fragments, electronic signatures that span document fragments, and style sheets for coherent presentation and interaction.

When large form applications are based on an XML file format, they are somewhat open and interoperable. Use of a custom XML vocabulary, when implemented in plug-in or other runtimes separate from web browsers, often limits access to the full power of well-known web resources that customers expect to be able to use, such as CSS™ and JavaScript™.

Web formats today, such as HTML, do not support packaging of composite resources directly—the page is the unit of content storage. Hyperlinks permit navigation among related resources but do not define collections of related content. Formats that collect related artifacts including HTML pages, images, and metadata into internally coherent entities are intended for archiving websites for historical or offline purposes, not as runtime platforms.

Most solutions to the packaging of composite web applications therefore are specific to the middleware platform on which the web application is deployed. Web application archive format (WAR) files are used by JEE web application servers to package and deploy the set of artifacts needed by a given web application including HTML pages or the Java Server Pages that create them, Java beans for storing and validating data during user interaction, and static resources such as images.

JEE web applications commonly include flow-based controllers such as Struts to control the internal behavior of the various artifacts included in the WAR file and to invoke back-end services as required. Generally, web archive (WAR) files define a packaging mechanism for composite web applications, but they do so in a platform-specific (JEE) way. Such archives are not transportable to other runtimes including non-JEE application servers or client-based runtimes.

Going beyond packaging formats, web archive files are deployment not runtime artifacts and hence do not define a network access protocol, or URL pattern, for accessing their contents. Web archives similarly provide no support for aggregating multiple content sources when several end-users are involved in a document-centric business process.

The emerging W3C format for widgets makes similar use of zip-based archives for packaging but, as in the JEE WAR example above, lacks requirements or support for an interactive protocol or instance-specific data storage. URI standards being defined for widgets are intended to resolve references internal to the widget from one resource to another. Prior work on composite document packaging focuses on adapting document content for rendering to multiple devices.

In traditional workflow, the token of control is the central focus and content (whether in documents or otherwise) flows through the process from one artifact to another as a result of the execution of a control path defined by the workflow. Documents and document behavior become secondary to control flow.

High level declarative languages for control are required just as they are for data and presentation. Many of today's complex forms processing systems require authors to "escape out" of their document-centric languages when describing behavior, even to manage document presentation and validation in single workflow steps with individual users. Document-centric formats that do not extend to behavioral control increase complexity due to the need to map repeatedly between declarative and procedural programming models.

Declarative languages for document behavior may nonetheless be expressed in multiple conceptual models, including flow-based languages with adaptations for human interaction, state-based languages, and time-based languages. These declarative languages share the advantage of being independent of the specific runtime middleware platform being used to support the composite web application.

Without a simple means to represent large or complex forms as composite documents, monolithic documents result in performance and scalability limitations, particularly on a logical client. Large documents are slow to transmit, parse, and display and consume large amounts of storage. When large forms applications are represented with a single XML document, the result is excessive, and sustained demand on memory resources is needed to provide a performant user experience. This is demanding on a rich client program, but it is even more demanding when the logical client includes a server program to present the parts of the document to an end-user through a web browser. The server side of the solution has the same performance challenges as a rich client for one user, but also does not scale up beyond a few dozen concurrent users per CPU.

The processing associated with a complex document may take place at multiple locations in a distributed system. End-users may interact with rich or thin clients. Web services may augment document content from the server. Intermediaries may transform document content in the network. The decision as to where to perform each document operation should be decoupled from how the document is represented to allow for "late binding" or alternative choices in how document processing is deployed onto a particular infrastructure. Lightweight means to provide language extensions to current browsers have been developed based on the use of JavaScript™ as an XML tag library implementation language rather than as the direct authoring language for web pages.

SUMMARY

A system and method for web application navigation control includes relating data entry fields in a page stored in computer readable storage memory with non-procedural computed dependency constraints that provide navigation control when a condition is met. A presence of user-side information is checked to determine if the condition is met and the indicated navigation control is to be invoked. If the condition is met, a trigger event is evoked to navigate to a new page based on at least one of a set of entry fields where data was entered in and a type of data content entered in the entry fields without guidance from procedural navigation code.

A system for web application navigation control includes a server including a dependency graph relating data entry fields in a page with a navigation instruction that provides navigation control when a condition is met. An interaction module is configured to be sensitive to at least one of user-side information entry and known information to determine if the navigation instruction is to be invoked. A processor is configured to execute the navigation instruction in accordance with a presence or absence of data values or conditions over those values to navigate to a new page based on at least one of a set of entry fields data was entered in and a type of data content entered in the entry fields without guidance from procedural navigation code.

A system and method for web application navigation control includes updating navigation data models used in navigation constraints with received data from an end-user or system. Without needing a centralized application-specific controller, from a collection of extensible navigation rules associated with each page of a plurality of pages, the extensible navigation rules are automatically selected which depend on changed data values and need re-evaluation. The navigation constraints associated only with the pages potentially changing their ready state to execute from among the plurality of pages in an entire application are evaluated to determine which pages are ready to run based on updated data from the navigation data models. A preferred page to be actually navigated to next is selected from among a set of all available and ready pages by execution of a set of second and separate navigation constraints using results of the navigation constraints of the evaluating step.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
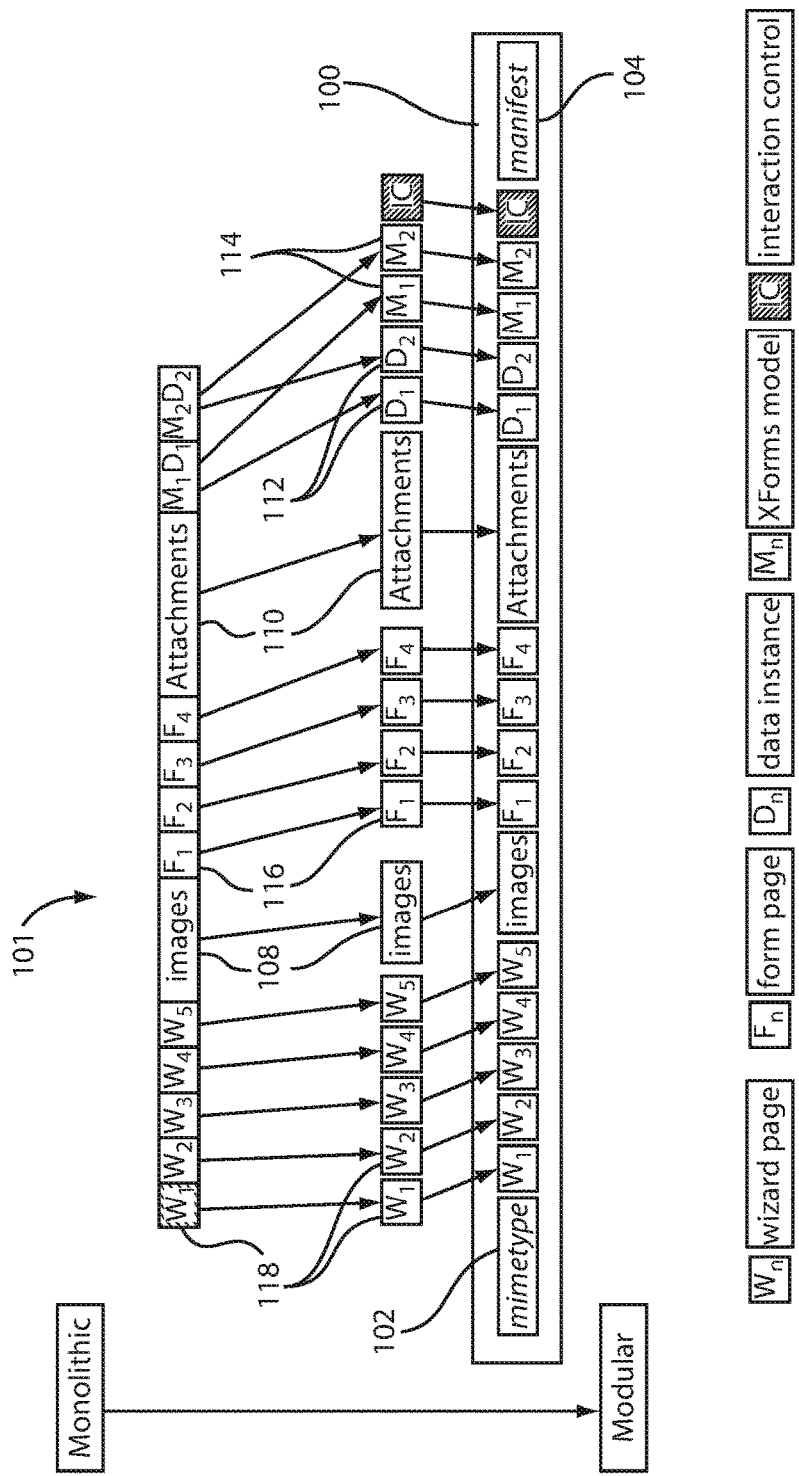
FIG. 1 is a diagram showing a monolithic document decomposed and aggregated into an interactive web document (IWD) in accordance with the present principles.

In accordance with the present principles, systems and methods for unifying storage and management of various artifacts for web applications and the like into an Interactive Web Document (IWD) are illustratively provided. Documents allow end-users to encapsulate information related to a collaborative business process into a package that can be saved, emailed, digitally signed, and used as the basis for interaction in an activity or an ad hoc workflow. While documents are used incidentally today in web applications, for example, in HTML presentations of content stored otherwise in back-end systems, they are not yet the central artifact for developers of dynamic, data intensive web applications.

The storage and management unification of the various artifacts of web applications into an Interactive Web Document (IWD) provides that data, presentation, behavior, attachments, and digital signatures collected throughout the business process are unified into a single composite web resource. A standards-based approach to packaging multiple resources into IWD archives based on the Open Document Format, a REST-based protocol for interacting with IWDs, and an extensible interaction controller architecture are illustratively described.

In accordance with the present principles, web application navigation control is provided by updating navigation data models used in navigation constraints with received data from an end-user or system. Without needing a centralized application-specific controller, from a collection of extensible navigation rules associated with each page of a plurality of pages, the extensible navigation rules are automatically selected which depend on changed data values and need re-evaluation. The navigation constraints associated only with the pages potentially changing their ready state to execute from among the plurality of pages in an entire application are evaluated to determine which pages are ready to run based on updated data from the navigation data models. A preferred page to be actually navigated to next is selected from among a set of all available and ready pages by execution of a set of second and separate navigation constraints using results of the navigation constraints.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A new composite document format called Interactive Web Documents (IWDs), based on reuse of existing standards such as the Open Document Format (ODF) packaging format is described. The format collects together all artifacts of a complex form moving through a business process. In addition, a REST-based protocol is defined for interacting with IWDs at runtime. A standard format for office-based documents (ODF) provides an archive format for packaging the various artifacts relevant to an office document, including content, style sheets, and images, along with a manifest itemizing those assets.

IWDs extend ODF packages in two ways: first, they reuse the ODF package format for interactive documents by defining a mapping between REST-based requests over the web into the internal artifacts stored in the archive. This mapping allows IWDs to maintain their identity as integrated resources. The second extension IWDs make to ODF archives is to allow for additional artifacts relevant to interactive forms, including (X)HTML pages, additional style sheets, documents defining data models (e.g. using XForms models) and declarative controllers managing transitions among these artifacts as the document executes. IWDs thus are containers for a set of smaller subdocuments, each of which can be served and rendered more quickly than the complete monolithic document while providing control over the navigation among the included documents and aggregation of data results from each.

The IWD architecture defines not only how IWD artifacts are stored internally in their ODF-based archive, but also how they interact with the external environment using a REST-based protocol. IWD runtimes support a set of URL patterns for REST-based interaction including GET, PUT, POST, and DELETE operations on documents inside the IWD resource. IWDs thus are well-behaved web resources and can be served by any web platform (client or server) able to support its REST protocol. Client-based access may be made directly to IWDs hosted by rich clients or remotely to IWDs served to a web browser or other thin client. Server-based middleware used to implement the backbone business bus over which IWDs execute in a business process likewise can manage IWDs using the same interface—treating the Interactive Web Document as a service.

The document-centric approach to forms applications is popular with both end-users and application developers. A new file format and processing model for describing rich interactive forms applications that preserves their document-centric nature while also better accommodating their memory and performance demands is presented in this disclosure. The file format itself is based on the ODF standard and (X)HTML web pages, while the rich, secure processing model is based on XForms and XML Signatures.

Referring now to the drawings in which like numerals represent the same or similar elements and initially to FIG. 1, a monolitihic document 101, its decomposition and aggregation into an Interactive Web Document (IWD) are illustratively depicted. Resources comprising a web application are stored within a single compressed archive file 100 that conforms to the ODF package format. As such the archive file 100 also includes an internal indication 102 of its content type and a manifest 104 of its resources, and their content types. FIG. 1 depicts the simple transition from a single, monolithic XML document 101 to the new Interactive Web Document (IWD) format 100.

A monolithic form document 101 stores in a single XML document all images 108, all supporting document attachments 110 provided by end-users, all XML data instances 112 and business rule models 114, all scripts and style-sheets 116, all web pages 118 needed for various wizard experiences, and all pages or other files which may be needed for high-precision "contractual" views and "print" views of the business function. In the Interactive Web Document 100, these resources are aggregated, yet their decomposition remains within the ODF package. Aggregating the resources enables the document-centric business process, and preserving the decomposition enables better design tooling, and it also enables the components to be addressable as separate resources via a REST service interface.

An application developer has the option of placing the data models ($M_n$) 114 into the web pages 118 rather than separating them out, thus allowing optimizing and tailoring the client-side business rules to control just what is on each page. The XML data instances ($D_n$) 112 are in separate files, and the many web pages ($W_n$ and $F_n$) 118 and 116 that may be needed to complete the business function are in separate files, each capable of sharing access to the XML data files in the package by simply referencing them with the src attribute of an <xforms:instance> (see below). Each of the web pages 118 (116) can permit the user to transition to any other web page in the document using an <xforms:submission> (see below), which also permits the next page to be determined dynamically from user input.

In lieu of directly expressing page transition instructions within the web pages 118, application developers may formalize the state transitions of the Interactive Web Document into a centralized interaction controller (IC) based, for example, on State Chart XML as described herein.

IWD Metadata: According to the ODF packaging format, the file which may be regarded as the root of processing is called content.xml. Other current ODF formats are used to contain the results of a rather passive and relatively free form user interface experience (e.g., text editing), and the contents of the content.xml file are appropriate to that task.

In the case of an Interactive Web Document, the ODF package is intended to aggregate the web application resources needed to perform a business function, and content.xml contains information relevant to that purpose. This can include: 1) an indication of the current web page on which to begin processing when the Interactive Web Document is launched; this setting initially indicates starting web page, but it can be adjusted whenever the user navigates to a new web page in the IWD; 2) the base URI of the server from which the document was first obtained; this setting is only automatically set if it is empty and the document was obtained from the web; 3) a document-level definition for the resources (e.g. PDF/A documents or web pages) that comprise the print view of the document; 4) an IWD template identifier to help easily determine the IWD template from which this IWD was instantiated; this setting helps optimize instantiation by enabling the ability to only instantiate IWD components that differ from the template; 5) a globally unique identifier (GUID) for the IWD to help track the IWD through a multi-user collaborative process; 6) an indicator of a centralized interaction controller file that helps manage the state of the IWD; 7) other IWD metadata, such as information about an IWD-internal cache of content from externally referenced URIs.

Although it is also feasible to store the shared data of an IWD in content.xml, the variation illustratively discussed herein uses separate data files as this simplifies both IWD authoring and the REST interface for the IWD. The metadata element indicates the current web page on which processing begins. As a result, the following markup provides an example of the content.xml file of an IWD:

```
<odf:document-content                    Dn
    xmlns:odf="&odfns;">
    <odf:office-body>
        <iwd xmlns="&iwdns;">
            <current>Page1.html</current>
        </iwd>
    </odf:office-body>
</odf:document-content>
```

Package-Relative Referencing: Many web-based technologies use URIs to enable a document to obtain or reference related web resources. A simple example is the src attribute on <img> and <script> tags in (X)HTML web pages. The web technologies used within an IWD are further equipped with a relative URI dereferencing facility that enables access to resources within the IWD that are positioned relative to the referencing resource.

Figure 2:
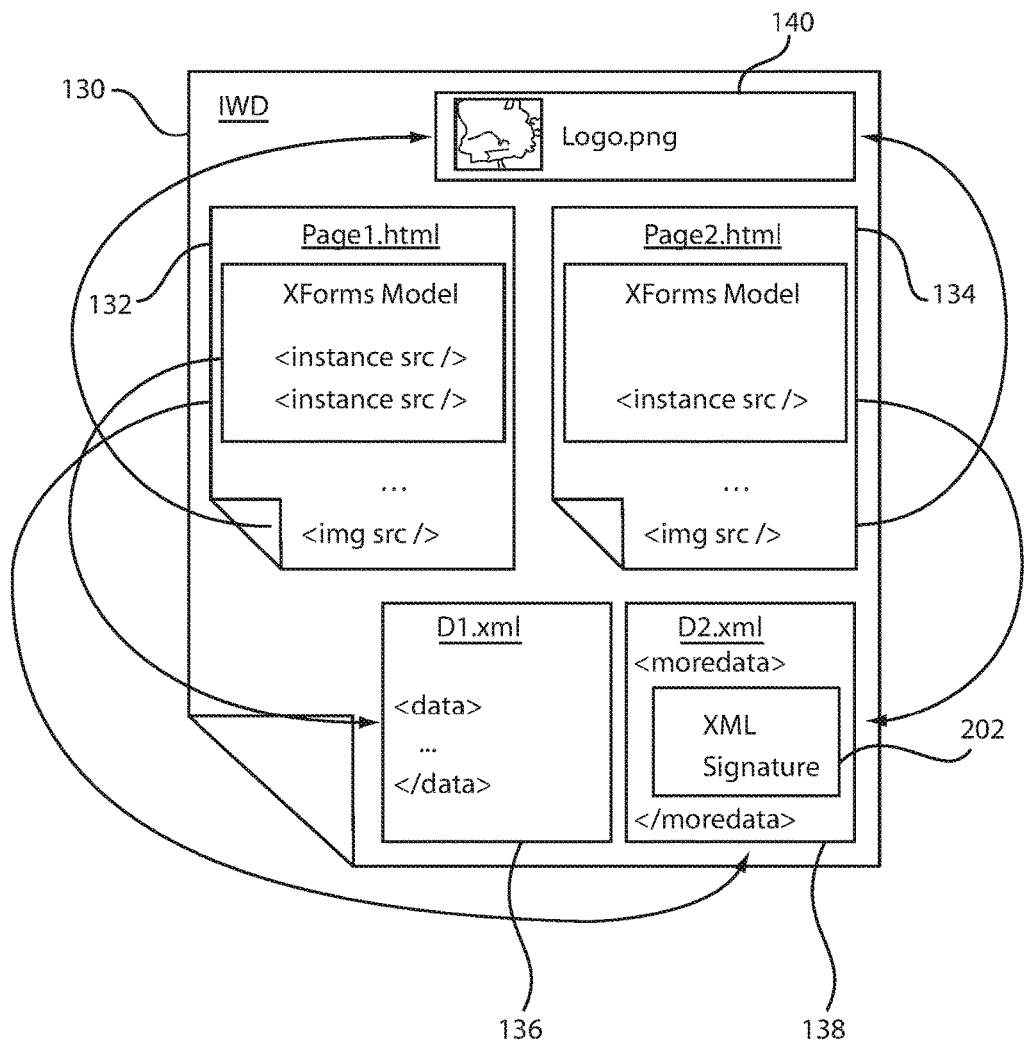
FIG. 2 is a diagram showing resources using svc attributes with relative URIs to access other resources in a same IWD.

Referring to FIG. 2, a diagram of a simple IWD 130 comprised of two web pages (Page1.html and Page2.html) 132 and 134, two data files (D1.xml and D2.xml) 136 and 138 and an image (Logo.png) 140. If Page1.html is stored in the root directory of an archive, and a file Logo.jpg is stored in an images subdirectory, then a web page can display the logo image using the following markup:

<img src="images/logo.jpg"/> $W_n$ $F_n$

Similarly, FIG. 2 shows that web pages can use an XForms element called <xf:instance>, where xf is bound to the XForms namespace, to access an XML data model, and that element also supports an src attribute. As a result, the following markup can be used to import the data file D1.xml from a data subdirectory into a web page in the root directory of the archive:

<xf:instance id="d1" src="data/D1.xml"/> $M_n$

Run-Time Behaviors of an IWD: Session Instantiation: There are a number of ways in which a user can begin interacting with an IWD. The user could click an anchor link to the IWD template or the user could make a request of a server endpoint that returns an IWD template or perhaps an IWD that has been partially completed in a prior session. In all these cases, the IWD content type on the outbound result is detected, and the content is rerouted to the IWD server via a POST operation. Rather than delivering the entire binary ODF package for the IWD, this operation creates an interaction session for the IWD and then returns a redirection page to the end-user that requests the <current> web page from the session-qualified IWD.

The act of instantiating an IWD interaction session consists of logically exploding its file resources into a unique directory determined dynamically at the time of the request. All further interactions on the IWD by the end-user are channeled through a session ID associated with that directory by the IWD server implementation. This permits any number of users to instantiate any number of IWDs since each instantiation results in a unique session directory. Note that if the IWD provides a template identifier, then rather than physically storing a copy of all files in the IWD, it is possible to detect which files differ from the template and to store only those. Requests for unmodified files are answered with content from the template. Once the IWD interaction session is created, access to IWD resources is channeled through the session-qualified URIs of a REST API that provides the standard CRUD operations (create, read, update, delete).

Data Sharing across Web Pages: Web pages are able to use XForms user interface bindings to enable the end-user to access and, depending on the form control, modify data stored in an XForms instance. In a single web page application, the XForms instance can contain the data as inline content. However, to share data across web pages, the data is stored in a data file in the IWD. For example let the file D1.xml in a data directory of the IWD contain the following content:

```
<policy xmlns="">                  Dn
    <name>Kazimierz
    Kuratowski</name>
</policy>
```

The data is then imported into a particular web page using the src attribute of the <xf:instance>, which makes the data content available via XPath referencing regardless of whether it was obtained from inline content or an external resource as follows:

```
<xf:instance id="d1"                Mn
    src="data/D1.xml"/>
...
<xf:input                    Wn     Fn
    ref="/policy/name">
    <xf:label>Insured
    Name:</xf:label>
</xf:input>
```

In this case, the web page contains both the model and user interface controls. When it is loaded in the web browser, resolving the src attribute does a GET request to the session-qualified IWD REST service for the resources named by package relative URIs.

Data Synchronization via Submissions: The end-user may wish to navigate to a new page or to submit a completed IWD to the back-end server application for processing. Since a current page will be discarded, any instance data modifications made by the end-user have to be saved to the IWD via PUT requests to the session-qualified IWD interaction REST service. These requests are made by <xf:submission> elements having the markup patterns described below.

Although most web pages in the IWD will tend to manipulate only one or two shared instances, the pattern for two instances easily extends to an arbitrary number. Thus, assume we have two instances, a first D1.xml and a last D2.xml:

```
<xf:instance id="d1"                Mn
    src="data/D1.xml"/>
<xf:instance id="d2"
    src="data/D2.xml"/>
```

Given these instances, the following markup pattern shows two submissions that put them to the IWD. In these submissions, the resource attribute indicates the package-relative URI to write (e.g. data/D1.xml or data/D2.xml), and the ref attribute indicates the instance whose content is written. The replace attribute indicates that nothing is replaced by the put operation, so processing of the current web page continues. The relevant and validate attributes indicate that the data synchronization submissions do not perform data validation or pruning of non-relevant nodes since these submissions are intermediate steps in an aggregate data collection operation.

```
<xf:submission id="Submit_data1"    Mn
    method="put" ref="instance('d1')"
    resource="data/D1.xml" replace="none"
    relevant="false" validate="false">
    <xf:send ev:event="xforms-submit-done"
        submission="Submit_data2" />
    <xf:message
        ev:event="xforms-submit-error">
        Server down, please try again.
    </xf:message>
</xf:submission>
```

```
<xf:submission id="Submit_data2"    Mn
    method="put" ref="instance('d2')"
    resource="data/D2.xml" replace="none"
    relevant="false" validate="false">
    ...
    <xf:message
        ev:event="xforms-submit-error">
        Server down, please try again.
    </xf:message>
</xf:submission>
```

The lifecycle of an XForms submission includes a final event, either xforms-submit-done on success (further above) or xforms-submit-error on failure (just above). For the error case, this markup pattern shows a simple way to report failure. In the success case, all data synchronization submissions except the last have a handler that initiates synchronization of the next data instance in the sequence. The xforms-submit-done event handling for the last data submission will be described below.

Figure 3:
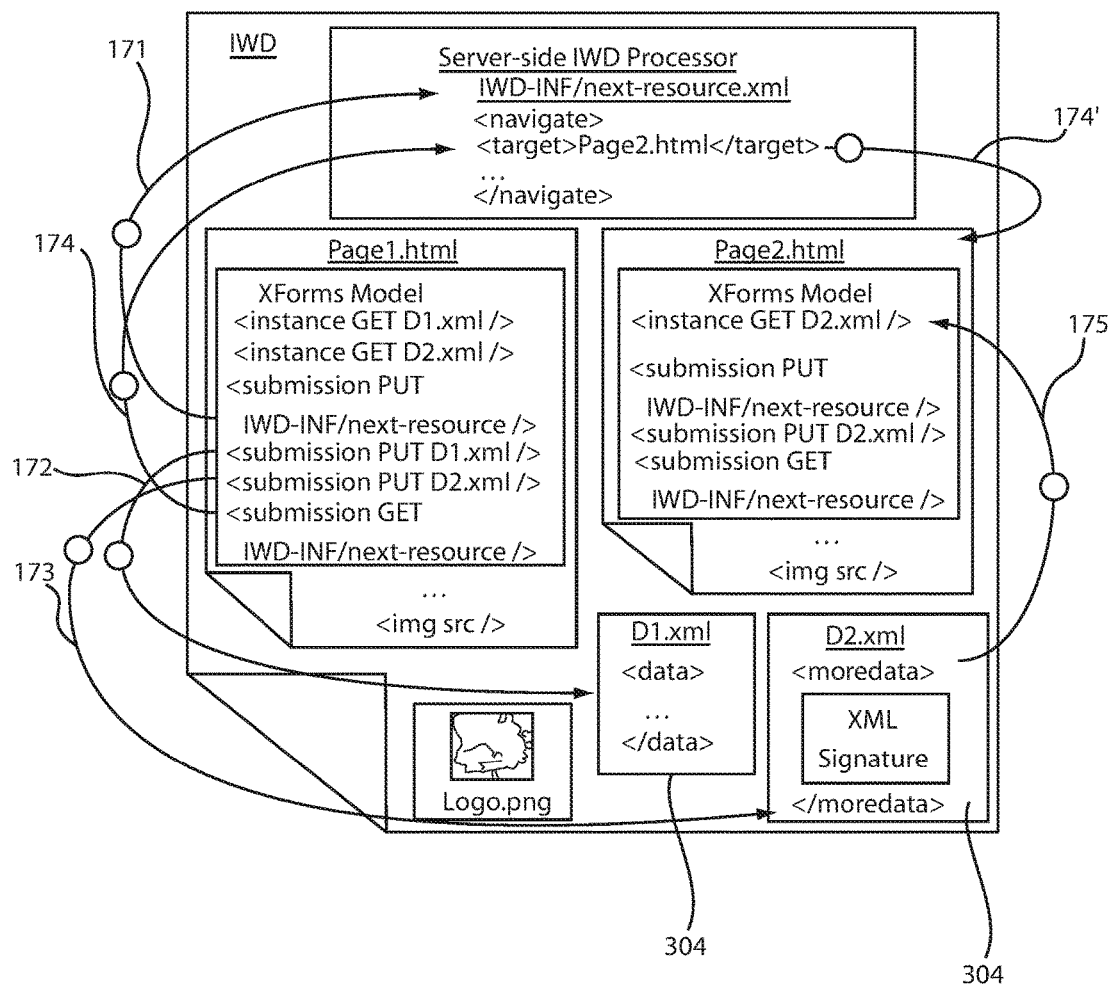
FIG. 3 is a diagram showing an illustrative page navigation submission sequence.

Web Page Navigation: Navigation to a new page within the IWD involves the use of a prime mover submission, the data synchronization submissions, and a page navigation submission. Referring to FIG. 3, a schematic of the sequence of submission operations (<submission PUT_>) for a page navigation is illustratively shown. First, the server-side IWD processor is informed (arrow 171) of a next resource, Page2.html. A second and third data synchronization submissions (172 and 173) put the data collected by Page1.html into a server-side IWD instance(s) 304. An IWD could have fewer or more of these submissions, depending on how many data instances need to be synchronized. A fourth submission (174) requests a next resource (174'), and a fifth submission (175) shows Page2.html consuming one of the results of the data synchronization.

The sequence can be initiated by an <xf:trigger>, which is a generic form control that may be represented by a user interface element such as a button. On activation of the trigger, the <xf:send> action is executed, which initiates the prime mover submission. In this example, a navigation to the second page of an IWD is shown:

```
<xf:trigger id="NavControl">                              Wₙ    Fₙ
    <xf:label>Go to Page 2</xf:label>
    <xf:send ev:event="DOMActivate"
        submission="NavIWD_Page2"/>
</xf:trigger>
```

The prime mover submission uses a local data instance to store the navigation information that will drive the web page navigation. It is necessary to save this information because the prime mover submission needs to first launch the data synchronization submissions, the last of which will execute the page navigation submission, so memory for the page navigation information is needed. Here is the markup for this instance:

```
<xf:instance id="NavTo">                                  Mₙ
    <navigate xmlns="">
        <target>Page2.html</target>
        <operation>page</operation>
    </navigate>
</xf:instance>
```

The <xf:trigger> above initiates the prime mover submission identified as NavIWD_Page2. The XForms submission process begins with an xforms-submit event, which occurs before the data submission. In the prime mover markup pattern below, the xforms-submit event handler provides the navigation target and operation parameters that will be needed after the data synchronization submission(s). These parameters are then put to a special resource called IWD-INF/next-resource provided by the REST interface. Once the submission succeeds, the xforms-submit-done handler initiates the data synchronization submissions.

```
<xf:submission id="NavIWD_Page2"                          Mₙ
    resource="IWD-INF/next-resource"
    method="put" ref="instance('NavTo')"
    replace="none"
    validate="false" relevant="false">
    <xf:action ev:event="xforms-submit">
        <xf:setvalue
            ref="instance('NavTo')/target"
            >Page3.xhtml</xf:setvalue>
        <xf:setvalue
            ref="instance('NavTo')/operation"
            >page</xf:setvalue>
    </xf:action>
```

```
    <xf:send
        ev:event="xforms-submit-done"
        submission="Submit_data1" />
    <xf:message
        ev:event="xforms-submit-error">
        Server down, please try again.
    </xf:message>
</xf:submission>
```

The xforms-submit-done handler was elided in the last of the data synchronization submissions. The following conditional handler invokes the page navigation submission, if the navigation operation is was set to 'page' by the prime mover:

```
<xf:send                                                  Mₙ
    ev:event="xforms-submit-done"
    submission="NavIWD"
    if="instance('NavTo')/operation='page'"
/>
```

The final page navigation submission performs a get operation on the IWD-INF/next-resource that was set by the prime mover submission. This submission replaces the current page with the next resource. On a server, the <current> element in content.xml is set to the next resource <target> value. Here is the markup pattern for the final page navigation submission:

```
<xf:submission id="NavIWD"                                Mₙ
    method="get" replace="all"
    serialization="none"
    resource="IWD-INF/next-resource"
/>
```

Document Completion Request: A similar submission sequence is used to submit an IWD for server-side processing, e.g., performing the business transaction represented by the IWD or taking the next step of a workflow and provisioning the IWD to another user.

Figure 4:
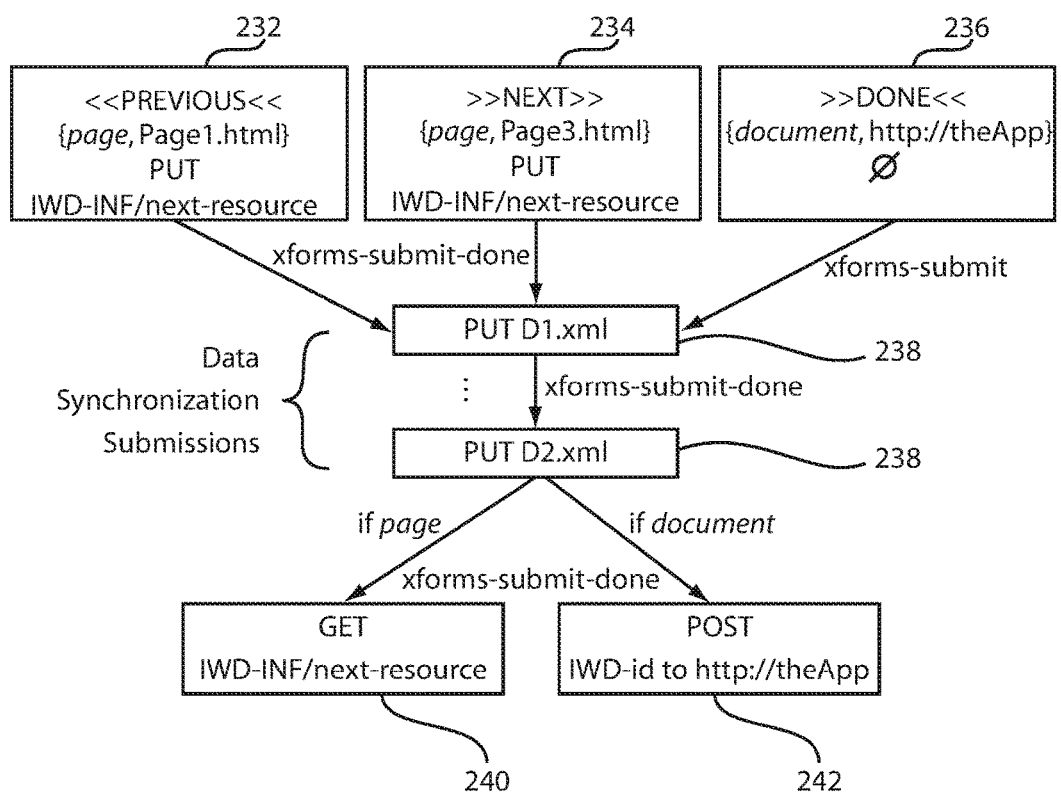
FIG. 4 is a diagram showing submission patterns for IWD interaction control.

Referring to FIG. 4, differences by putting the document completion submission pattern in context with a page navigation submission pattern is illustratively depicted. Page navigation instructions include previous 232, next 234 and done 236. There are only a few differences in the prime mover submission for IWD document completion, relative to the prime mover for page navigation. First, the submission would be initiated by a distinct xf:trigger (labeled >>DONE<< 236 in FIG. 4). Second, the navigation <target> is a business process or server application module endpoint, rather than an IWD web page resource. Third, the navigation operation is set to 'document' rather than 'page'. Fourth, the prime mover submission does not need to submit any data to the IWD, so data synchronization submission(s) 238 can be initiated during the xforms-submit event rather than xforms-submit-done. These changes result in the following markup pattern for the document completion prime mover submission:

```
<xf:submission id="CompleteIWD">                          Mₙ
    <xf:action ev:event="xforms-submit">
        <xf:setvalue
            ref="instance('NavTo')/target"
            >http://theApp</xf:setvalue>
```

```
<xf:setvalue
    ref="instance('NavTo')/operation"
    >document</xf:setvalue>
  <xf:send submission="Submit_data1"/>
 </xf:action>
</xf:submission>
```

As FIG. 4 also shows, the last data synchronization submission receives another xforms-submit-done handler so that it is able to conditionally launch the document completion submission:

```
<xf:send                                               Mn
    ev:event="xforms-submit-done"
    submission="SubmitIWD"
    if="instance('NavTo')/operation='document'"
/>
```

The document completion submission occurs at the end of an interaction session with a particular client-side end-user. Its purpose is to provide the IWD to the server-side business process or application module, which then decides whether to provide the IWD to another collaborator in a workflow or to use the IWD content to drive back-end business transactions. Here is the markup pattern:

```
<xf:submission id="SubmitIWD"                          Mn
    method="post" replace="all"
    serialization="&iwdContentType;"
    encoding=base64"
    validate="false" relevant="false">
  <xforms:resource
      value="instance('NavTo')/target"/>
</xf:submission>
```

This submission uses a custom serialization to which the IWD processing code is responsive, i.e., the IWD processor overrides the default XForms serialization via the xforms-submit-serialize event. There are two conceptual models for providing the completed IWD to the business process or server application module, a push model 242 and a pull model 240. Under the push model 242, the completed IWD is repackaged into a full IWD serialization that is posted to a server application module. However, this model is less efficient than the pull model 240, so the latter is used as the default. Under the pull model 240, a main piece of information that is serialized and transmitted to the server application module is just the interaction session ID for the IWD. This allows the server application module to pull any needed IWD content from the interaction session. The server application module may request the entire repackaged IWD if needed for archival purposes, but most business process steps just pull the data needed to drive specific transactions or provide the same interaction session to the next collaborator in a sequential workflow. Thus, the approach of instantiating a REST service for document interaction enables significantly optimized responsiveness to the actual data processing requirements of business processing pipelines and collaborative workflows.

Platform-Independent Performant Implementation: The IWD Server implementation is described as the set of server resources available and a REST API that the server supports. The notable resources maintained on an IWD Server can be attributed to the following resource types:

1. IWDs—This is a singleton resource that is the collection of all active IWD instances of the server.
2. IWD—Within IWDs, each IWD instance is represented by a GUID.
3. Entry—Within an IWD instance, there are a number of entry resources corresponding in name to the ODF entries for each IWD instance, for example, http://server.com/IWDs/a-GUID/Page2.html.
4. ic—Within an IWD instance, there is one interaction controller resource.
5. export—For each IWD instance, this resource provides IWD instance as an archive, terminating its interaction session.

The various higher level operations, such as page navigation, document completion and signature generation and validation, are supported by low level REST API operations such as those described in Table 1. The two resource types marked by an asterisk, viz. IWD* and Entry*, indicate that those are not the literal URL fragments used in the REST API. In the first case, an individual IWD resource is identified by its GUID instead. For an Entry resource within a given IWD instance, the relative path from the base of the ODF-package is used instead. IWD Servers may implement access control rules on one or more of these resource types and operations. By defining web application interaction in terms of the ODF packaging format and a REST API, we enable platform independent implementation. In one embodiment, a IWD Server implementation can be built using JAX-RS, which defines a Java API for RESTful Web Services.

TABLE 1

The REST APIs for the Key Resource Types

| Resource | Operations | Semantics of the Operations |
|---|---|---|
| IWDs | GET | Returns list of IWD instances |
|  | POST | Creates an instance of the posted IWD |
| IWD* | GET | Returns IWD instance (if application/vnd.ibm.iwd is accepted) or list of IWD entries (if only text/html is accepted) |
|  | DELETE | Destroys the IWD instance |
| Entry* | GET | Returns a specified resource within the IWD instance |
|  | PUT | Creates or replaces a resource in the IWD instance |
|  | DELETE | Deletes a resource from the IWD instance |
| ic | POST | Returns the next page in the IWD as decided by the IWD's interaction controller |
| export | GET | Returns a portable export of the IWD instance archive and terminates the IWD instance interaction session |

The present definition also supports a desired property of application instance portability via export GET and IWDs POST operations. These enable the entire web application interaction session to be serialized, transported across enterprise IT domain boundaries, and then reinstantiated. For example, a patient intake record can be instantiated at a medical clinic, transported to a hospital, embellished with diagnosis and treatment information, and then transported again to an insurance claim center.

Consolidating the Interaction Workflow in the IWD: Extending the IWD Interaction Model: The IWD file format enables creation of server resource-friendly, high performance large forms applications by virtue of packaging the forms application as a composite made up of multiple documents to furnish the pertinent views, data, logic and so forth. A formalized IWD interaction controller can build upon data views packaged within the document by introducing a dynamic, data driven management construct for page navigation and other behaviors. The IWD run-time processor supports a pluggable notion of such an interaction controller (IC) to define and execute the IWD page transition workflow with graceful fallback to static navigation schemes in the absence of such an IC.

State Charts for Interaction Control: It is possible to formalize the view state transitions using a state chart that models the closure over all potential page transition sequences that may occur during the IWD instance run-time lifecycle, from document instantiation leading up to document completion. The IWD run-time processor enables plugging in a State Chart XML (SCXML) based definition of an IC. A processor detects whether an IC has been plugged in by introspecting the contents of the ODF content.xml, specifically the "ic" component in the IWD definition. Consider the following:

```
<off:document-content                D_n
    xmlns:off="&odfns;">
  <off:office-body>
    <iwd xmlns="&iwdns;">
      <ic>controller.scxml<
/ic>
    </iwd>
  </off:office-body>
</off:document-content>
```

The above content.xml snippet conveys the following information to the IWD run-time processor: Foremost, it conveys the presence of an IC for managing the page navigations within this IWD. Secondly, it conveys the location of the IC, specified by the relative URL "controller.scxml" with respect to the root of the REST-based URL for the IWD instance. The presence of an IC causes the IWD run-time processor to augment certain phases in the IWD lifecycle with additional processing to support dynamic page transitions. It also dedicates the relative URL "ic" to the dynamic interaction controller resource for the IWD instance, such that a GET request delegates dynamic page navigation to the IC. Further, it necessitates minor changes to the markup patterns for the prime mover and page transition XForms submissions in individual web pages within the IWD, as described below.

Once the run-time processor establishes the unique session identity and completed the IWD instantiation by exploding the template contents as necessary, it delegates the act of determining a first page to be provisioned to the client to the corresponding IC instance. The run-time processor traverses the relative URL to locate the IC definition for the IWD and creates an IWD instance specific SCXML processor based on that definition. This SCXML processor subsequently reads in any parts of the data model, i.e., specific XML data instances that the state chart refers to. The runtime processor triggers an instantiation event on the SCXML processor, which causes the SCXML processor to follow appropriate transition(s) based on their XML-data dependent guards and come to rest in some initial state. This initial state is queried by the IWD run-time processor to determine the first page to provision to the client. The id of the current state is also the relative URL to the corresponding page to be provisioned to the client when in that controller state, but other mapping techniques may also be employed.

Just before the initial web page is delivered to the client, the run-time processor saves the state of the instantiated SCXML processor in the "ic" subdirectory of the exploded IWD instance. Similarly, XML data changes, if any, are saved to the proper locations in the "data" subdirectory. The web pages delivered to the client obtain the XML data for their XForms instances from package-relative URIs in the src attributes, and they perform data synchronization via XForms submissions. However, page navigation requests are submitted to the package-relative "ic" URI which represents the dynamic interaction controller resource for the IWD. Navigation is driven by logical targets, rather than concrete URLs. The trigger which initiates the submission sequence determines the name of the event to be fired on the state chart controller.

Figure 5:
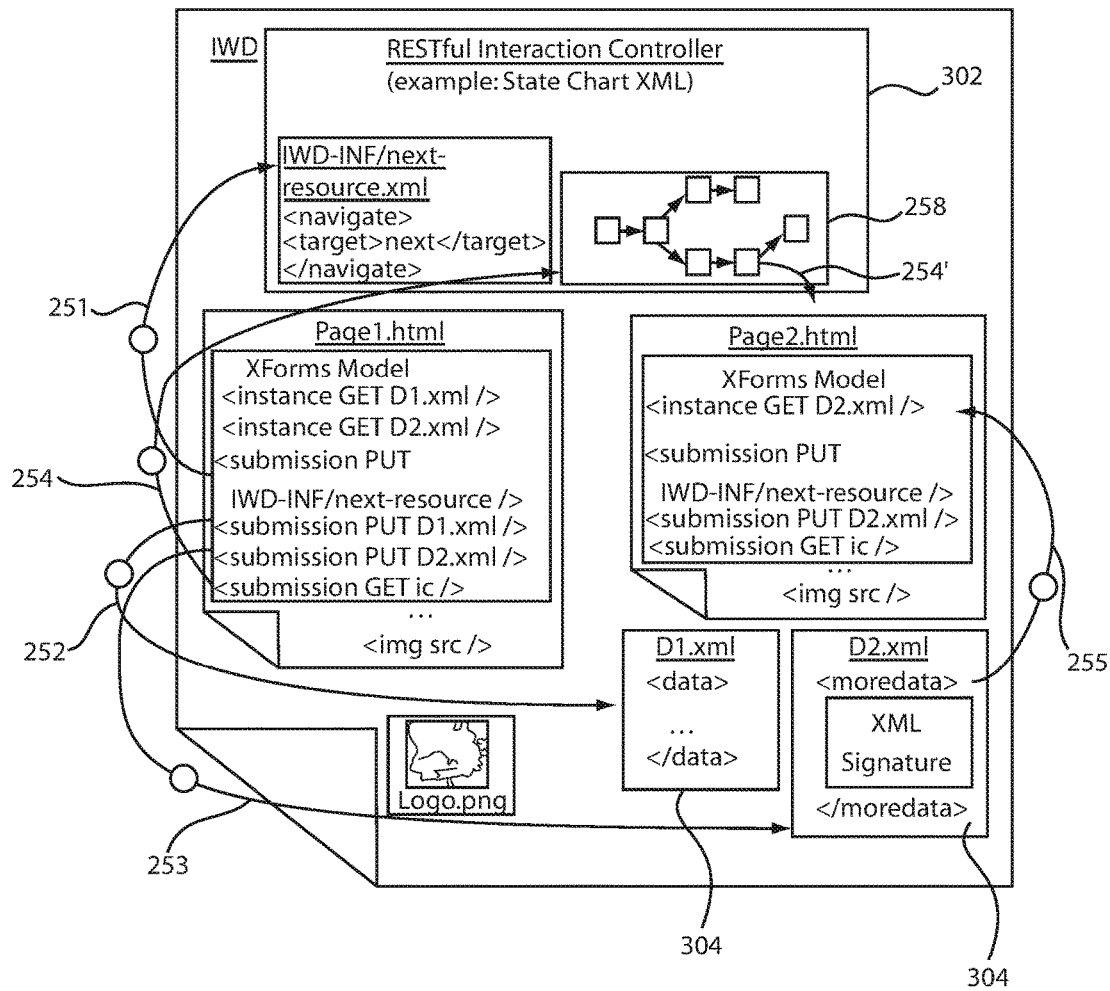
FIG. 5 is a diagram showing an interaction controller submission sequence for interaction control based page navigation.

Referring to FIG. 5, a schematic of such sequence of submission operations for IC-based page navigation is illustratively shown. First, a server-side IWD processor 302 is informed of the name of the event to be fired, "next". See arrow 251. A second and third data synchronization submission (252 and 253) puts the data collected by Page1.html into a server-side IWD instance(s) 304 using a chaining pattern described above. A fourth submission (254) requests the dynamic interaction controller resource for the IWD which is determined by an active state (254') in a state chart 258 based controller implementation, and a fifth submission (255) shows Page2.html consuming one of the results of the earlier data synchronization. This pattern results in certain changes to the previously described markup patterns. The instance that stores the navigation information takes the form:

```
<xf:instance id="NavTo">              M_n
  <navigate xmlns="">
    <target></target>
  </navigate>
</xf:instance>
```

Since page navigation is delegated to the IC resource, the prime mover XForms submission specifies the logical target, i.e., the name of the event to be fired on the state chart 258, rather than a concrete package-relative URL for the subsequent page:

```
<xf:submission id="ICNavigate_Next"           M_n
    resource="IWD-INF/next-resource"
    method="put" ref="instance('NavTo')"
    replace="none" validate="false"
    relevant="false">
  <xf:setvalue ev:event="xforms-submit"
      ref="instance('NavTo')/target"
      >next</xf:setvalue>
  <xf:send ev:event="xforms-submit-done"
      submission="Submit_data1"/>
  <xf:message
      ev:event="xforms-submit-error">
    There was a problem contacting the server.
    Try again.
  </xf:message>
</xf:submission>
```

Any intermediate data synchronization XForms submissions continue to use the same patterns. The trigger for the prime mover XForms submissions in the user interface reflects the dynamic nature to the user with appropriate labels:

```
<xf:trigger>                                           Wn    Fn
    <xf:label>Next Page</xf:label>
    <xf:send ev:event="DOMActivate"
        submission="ICNavigate_Next"/>
</xf:trigger>
```

The page navigation submission targets the package-relative "ic" URI for the dynamic IC resource:

```
<xf:submission id="NavIWD" method="get"      Mn
    serialization="none" resource="ic"
    replace="all" />
```

Once the page navigation submission makes a GET request to the server at the package-relative "ic" URL, the IWD run-time processor restores the SCXML processor from the state previously saved in the IWD instance's "ic" subdirectory, which then reads in any XML data instances the state chart refers to. These XML data instances have already been updated by the chained data synchronization XForms submissions as necessary. The run-time processor then reads the name of the event to be fired on the SCXML processor (by retrieving the "NavTo" instance data stored at the location "WEB-INF/next-resource") and fires the state transition bearing the corresponding name in its event attribute. The SCXML processor follows appropriate transitions based on their XML-data dependent guards and comes to rest in some state. The target attribute of a transition indicates the id of a quiescent state. The IWD processor determines the next page to provide from this state. Again, in one mapping, the new resource to return is based on the id of the new state. The SCXML processor state and any data changes are saved to the IWD instance, and then the new page is provided to the client.

Figure 6:
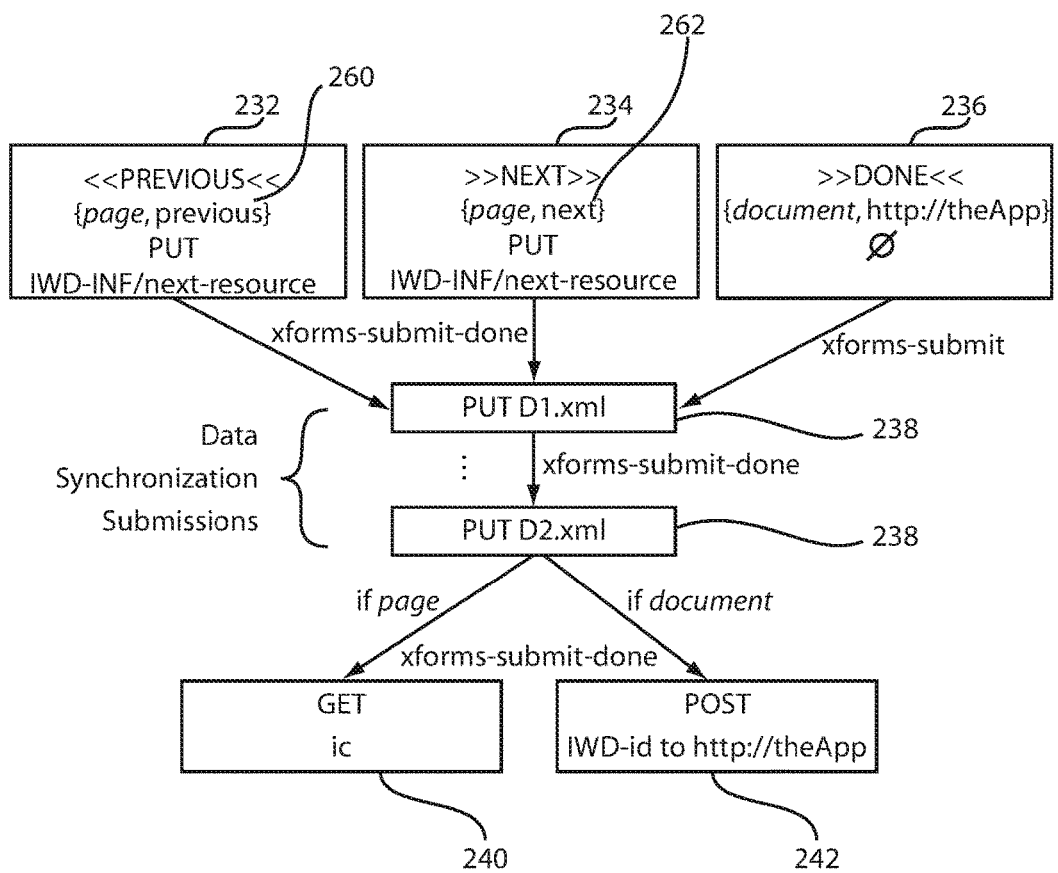
FIG. 6 is a diagram showing submission patterns for IWD interaction control using logical navigation targets.

Referring to FIG. 6, a submission sequence to submit an IWD for server-side processing on document completion is shown and is similar to that described above in FIG. 4. A notable difference is that page navigation uses logical navigation targets such as "previous" 260 and "next" 262. The relevant markup described also appears in the above examples. Notably, those examples about service invocations and document completion. Compared to the basic IWD lifecycle previously described, the IC-based IWD completion request here may not require a distinct submission to a server application module or business process module due to the ability to implement simple workflows via SCXML service invocations.

Service Invocations: A state chart IC that manages a series of wizard style interactions across views within an IWD is also capable of declaratively describing synchronous as well as asynchronous service invocations as part of the activities performed while entering and exiting controller states, or on particular state transitions. The services orchestrated into the workflow vary widely depending on the application. Common tasks include sending notifiers and updating logs. As a simple example, consider an expense report application where the submission of a report delivers a confirmation email to the person filing the report. The following SCXML markup illustrates the invocation of the email service as part of the view transition from the completed document submission page "submit.xhtml" to the page "completed.xhtml" that informs the user that they have completed the business process and that a confirmation email will be sent:

```
<scxml:state id="submit.xhtml">                        IC
    <scxml:transition event="submit"
            target="completed.xhtml">
        <service:email
            to="instance('expense')/empl/email"
            subject="concat('Expense Report#',
                instance('expense')/id)">
            Thank you for submitting an expense
            report for the amount of:
            instance('expense')/total
            The approver is:
            instance('expense')/approver
        </service:email>
    </scxml:transition>
</scxml:state>
```

Collaboration across Actors: The RESTful API for IWD interaction ensures that interactions with IWD instances are not constrained to a particular user agent or actor. The state chart IC can be used to coordinate the set of collaborative tasks required for IWD document completion. The following SCXML markup illustrates a collaboration scenario wherein the submission of an expense report notifies a new actor, the approver, of a task requiring attention:

```
<scxml:state id="submit.xhtml">                        IC
    <scxml:transition event="submit"
            target="completed.xhtml">
        <service:email
            to="instance('expense')/empl/email"
            subject="concat('Expense Submitted#',
                instance('expense')/id)" />
        <service:email
            to="instance('expense')/approver/email"
            subject="concat('Expense For Approval#',
                instance('expense')/id)" />
    </scxml:transition>
</scxml:state>
```

Using XForms Data in Interaction Controllers: We consider an active XForms data model within a running server-side IWD session as an extension to a simple storage-only data model. By treating data synchronization submissions as updates to a server-side running model, within-package XForms bind expressions can be triggered, which offer an opportunity for additional layers of validation, constraints, and spreadsheet-like calculations across the IWD as side-effects of data synchronization. An executing IWD can then use these results to invoke web services, intelligently reflect errors back to the user, or modify page navigation, as appropriate.

Conventional systems require program code to link web page invocation and other actions. In accordance with the present principles, a dependency graph may be set up to provide the needed triggering of webpages, logical chaining and other actions. For example, if three data fields need to be filed out and a user does so, a bind construct or other construct automatically triggers a new action such as opening a new web page or the like. In this way, a user is navigated through a website based on their own actions. The programmer need only create a dependency graph and not program each and every sequence to link pages and cause a user to be guided through a web page. This provides an enormous amount of flexibility for both the programmer and the user.

Advantageously, a data-driven web application control is provided. Page navigation is selected by presence/absence of data values or conditions over those values, and not pre-determined by programming code. Changes to data values may trigger a return to earlier pages in flexible or unanticipated patterns without explicit coding by a page author. Execution may then resume where the user left off without reprompting for intermediate steps. In one embodiment, data may be provided by other means, e.g., without asking the user and may cause intelligent skipping of steps when the system determines it already has that information—leading to flexibility in user interaction. For example, the system may include a user's date of birth from an unrelated profile stored in the system or other means. This information is employed to fill in a data field automatically without user intervention. The provided data along with any other information needed is still employed to trigger a page change in accordance with the dependency graph conditions.

Application navigation can be extended or customized by authors/programmers by adding additional "bind" statements without the need for pre-defined extension points as in conventional programming code. E.g., an author can create dependencies between the presence of data in certain data fields so that navigation can be customized as desired. Navigation behavior results from a sum total of all the binds present whether provided by the original or extended application (customized).

Application authors can work at the level of their "business logic" and not at the lower level implementation details of application control. This raises the level of abstraction of web control so that business analysts and other non-developers can do more work without the help from programmers. Navigation control is independent of specific middleware (e.g., Java EE) so can be moved flexibly to other platforms such as Microsoft .NET or Google App Engine, or to run on a client in a browser. This provides a significant advantage as applications are authored in a cloud and may be deployed to run on a variety of platforms.

In the same way, the application can be more easily moved from one device to another which may not have the same "page" structure since application flow is determined strictly by the set of data values and bind expressions in effect. We can save an application on one device and reload it on another which has slightly (or significantly) different bind expressions and get varying behavior in a way not achievable in current programming models or middleware.

In the markup example below, the XForms data instance in loan.xml is assumed to include elements for the name and income of the primary borrower of a hypothetical loan as well as elements for optional information for the borrower's spouse. The desired business logic is to customize the application's navigational path to prompt for spousal information when the income of the primary borrower is below some threshold value, such as $80,000, as indicated in the bind expression associated with the model.

```
<xf:model id="test">                                    IC
    <xf:instance id="loan" src="loan.xml"/>
    <xf:bind nodeset="instance('loan')/Spouse"
        relevant="instance('loan')/Borrower/Income
            < 80000">
    </xf:bind>
</xf:model>
```

The XForms bind expressions are declarative expressions written in XPath which allow authors to compute "model item properties" (MIPs) that provide calculated values, define validation constraints, and indicate when specific data in a model is needed, read only or relevant given the state of instance data anywhere in the model.

Such bind expressions are used on the client in XForms documents that interact directly with the user—controlling the visibility of user interface controls on the screen, indicating error states, and ensuring all required fields are filled before form submission. Model item property bind expressions are explored where data required to make the decision is not provided to the client-side web page. For example, it may be necessary for efficiency to avoid providing all data instances of a large model to the individual web pages of an IWD, or it may be that the decision needs to be based on the result of a web service if, for example, the decision logic or its intermediate data should not be placed in the IWD for privacy, security, or trade secret reasons. Instead, only the results of the web service would be placed in the IWD, where relevance expressions, as in the markup example above, or other bind expressions can then be brought to bear in the interaction session.

XForms Data in State-Chart Controllers: In one embodiment of our IWD implementation, we exposed model instance data as well as model item properties (such as calculate, constraint, required, read-only and relevant) to the IWD's interaction controller. As shown in the example markup below, the various MIPs were referenced using XPath functions in the SCXML transition conditions. In this example, the application begins with loan1.html, indicated by the initial attribute of the controller's root scxml element. Upon submission of the form data from the client, all data instances in the server-side model that have matching instances in submitted data are updated with content from the client. The transition condition will result in navigation to cosigner.html if the spouse data elements are flagged as relevant by the bind expression or to loan2.html otherwise.

```
<scxml initial="loan1.html">                            IC
    <state id="loan1.html">
        <transition event="next"
            cond="iwd:Relevant('loan', 'Spouse')"
            target="cosigner.html"/>
        <transition event="next"
            target="loan2.html"/>
    </state>
    ...
</scxml>
```

We have experimented with providing XPath functions that allow SCXML controllers to reference live XForms model data and relevance MIPs as shown in the example. Providing access to required and validity MIPs would be similarly straightforward. Similarly, providing XPath functions for setting data values would be a valuable next step. We provide implementations of many XForms actions, e.g. setvalue, delete, insert, and especially send (for calling web services), as custom actions to be used in SCXML onentry, onexit, and transition elements.

XForms as an Interaction Controller: A function of interaction controllers is to compute the next page to be displayed in an IWD and expose that value through the IWD-INF/next-resource entry of their REST interface. A wide variety of interaction controller implementations is possible for determining the next interaction step as a function of the current state of the IWD. The markup example below and its following description will be used to explore the possibility that the data-driven bind mechanism of XForms models is sufficient to drive IWD navigation in a purely declarative programming manner. The declarative nature of such a web controller would provide a significant simplification over current practice based on imperative languages such as Java or PHP, or even on higher level abstractions such as the SCXML state machines described above for a set of applications.

The declarative nature of this controller specification means that web authors can focus on the abstract conditions under which a particular page should be presented to the user and not on the procedural means for how to control the selection of the next page in navigation.

Markup example:

```
<xf:model id="test">                                    IC
    ...
    <xf:instance id="IC">
        <IC xmlns="">
            <nextIWDEntry/>
            <pagetable>
                <page1>
                    <ready>true</ready>
                    <name>loan1.html</name>
                </page1>
                <page2>
                    <ready>false</ready>
                    <name>loan2.html</name>
                </page2>
            </pagetable>
        </IC>
    </xf:instance>
    <xf:bind nodeset="instance('IC')">
    <!--- guard conditions for each page --->
    <xf:bind nodeset="pagetable/page1/ready"
    calculate="if(
            instance('loan')/Borrower/Name
            = '', 'true', 'false' )"/>
    <xf:bind nodeset="pagetable/page2/ready"
    calculate="if(instance('loan')/Principal
            = 0, 'true', 'false' )"/>
    <!--- pick the first ready page --->
    <xf:bind nodeset="nextIWDEntry"
    calculate=" . . /pagetable/*[ready='true']
            /name"/>
    </xf:bind>
</xf:model>
```

The markup example above shows the 'test' XForms loan data model extended with an additional "IC" instance to store the ready-state of each page in an IWD. Each page has a ready element set to "true" or "false" indicating whether the corresponding page with the given name should be in the set of pages from which the next page will be selected.

A set of bind expressions determines the readiness of each page according to application specific business logic. In particular, the readiness of the loan2.html page is computed by a bind expression that tests the presence of a specific loan amount. Whenever the principal data element value is "0", the loan2.html page is ready to run and its ready flag in the pagetable/page2 entry is set to true. Otherwise, when the loan amount has been provided—by whatever means in whatever order with respect to other pages—loan2.html will not be presented to the user.

Unlike the prior art in web navigation techniques, these readiness constraints need not be coordinated by a central application-specific navigation controller implemented by web authors. Rather, the separate and individual constraints determine the readiness of an associated page as distributed units of logic. The constraints thus form a much more de-centralized and extensible approach to web navigation specification than current technologies.

The extensibility of web navigation constraints means that new expressions may be inserted into the set of navigation constraints without concern as to their order in the overall program specification, e.g., without concern for their sequence in the markup example above. The execution order of navigation constraints is determined by the set of expressions which need to be re-evaluated given their dependence on input values which have been updated in the current cycle of execution—by data model changes either from the user or related system components. These data changes imply a set of navigation constraints which are now potentially invalid and need to be recomputed. Only those constraints will be selected for re-evaluation among all those present in the application.

The order of execution among the constraints which have been marked for re-evaluation is determined by examining which among them have all inputs determined and which require intermediate values which may be provided by other constraints to themselves become available for execution. All of this navigation constraint execution management is provided automatically by the underlying navigation framework and is, unlike conventional technologies, not required to be implemented by the application author.

The set of navigation constraints may also be extended by developers other than the original application author. Given the flexibility of the above execution management structure, other developers wanting to add navigation constraints can think solely in terms of the incremental logic they need and again unlike current technologies avoid the complexity of the additional logic of integrating their new constraints into the overall operation of the system. Their navigation constraints are simply added to the overall set in play in a particular application and execute in a manner consistent with those constraints they are extending.

The declarative nature of the navigation constraints, together with the considerable ease of extending constraints without need for additionally specifying their interaction with prior constraints, enables non-programmer designers to be able to manage the creation and extension of web navigation in a manner that previously required higher skilled developers working with conventional procedural languages such as Java, Javascript, or C to accomplish.

Very often, more than one page in an application will be marked as ready to run given the evaluation of the set of navigation constraints in any given cycle of execution. Rather than fixing a specific or "hard coded" strategy for picking the best page to present to the user from among this set of available ready pages, an additional level of navigation constraints is used to make this determination and to break these "ties". Using the same formalism, i.e., the same declarative language for navigation constraints and the same automated execution process for tie-breaking as for page evaluation, means we have a uniform and also easily extensible technology for resolving conflicts among multiple possible pages as well as for determining the readiness of the pages themselves. This uniforming and extensibility means that all aspects of navigation control can be authored and extended by non-programmers and presented in design tool environments in a consistent manner.

In the example markup above, a second "bind" expression determines which of the 'ready' pages should be selected as the next step in running the IWD application. In the markup example, the bind simply selects the first page having a ready flag of true and sets the corresponding page name as the current value of the nextIWDEntry element, which the REST implementation maps to IWD-INF/next-resource method calls.

The binds in this example are designed to give the idea of declarative interaction control, and a more realistic IWD web application would use more involved 'ready' state rules, e.g., to allow the user to go back to the web pages for previous steps. For example, if the user had already progressed beyond the second page, loan2.html, and had progressed a loan amount, then loan2.html would normally be marked as not ready for execution and would not be presented to the user. If some further consideration caused the principal field in the data model to be reset to zero—for whatever reason—then the effect on the web navigation as seen by the user would be to re-cycle back to the loan2.html page and reprompt for this information without need for the application author to separately consider and implement this "exception" type of navigation control. Having exception navigation results from the side-effect of changes to the data presents an extremely flexible programming model and removes considerable complexity from the navigation path design problem as it allows the author to focus on the main paths of navigation allowing exceptions to cause momentary jumps back to correct earlier steps.

Note that the resulting return to the main path of navigation will also occur automatically. Once the user has seen loan2.html again, and re-entered the loan principal, those pages between loan2.html and where the exception occurred will likely be still marked as not ready for execution since their work has been accomplished, and the user will return automatically to the point of interruption. If there are additional intermediate results that have been invalidated by the reprompting for the loan principal, then those pages and only those pages will be presented again for the user to perform only the minimal rework required by the exception.

Note that the strategy of opportunistically presenting that page which reflects the next unit of work needed given the state of data actually present in the system also allows for the navigation path to "skip ahead". If some data elements can be derived automatically by system components rather than being provided by directly by the end-user, then those pages responsible for prompting the user and providing those values will already be marked as not ready for execution—since their work as been accomplished by other means than involving the end user. The actual navigation seen by the user therefore will be optimized for the data actually needed to complete the problem and can vary substantially depending on the data available or derived by the system at the time of interaction.

An additional technical aspect of this design includes the way for invoking web services defined in the controlling the XForms model. Web service definitions themselves can be placed within the XForms model in XForms submission elements, which can specify the resource URI, the submission method, the data to send and its format, and how to process the result. To invoke the service, events occur corresponding to IWD data synchronization, and since this operation updates the data instances xforms-insert and xforms-delete events are appropriate. The XForms send action, which initiates an XForms submission, can be set to hook these events, and the 'if' attribute can be used for conditional invocation.

Note that a dependency graph of XForms bind expressions is not equivalent to a more general business-rule-based approach such as in a full production system or constraint solver. There are prior uses of rule and constraint systems for business process management in which each step in application flow is derived from the execution of a set of rules or solution of a set of constraints. The present embodiments provide a large and interesting set of applications where a more restricted data dependency graph—akin to a spreadsheet model rather than a full rule set—is sufficient. Particularly for presentation-oriented flow control, such an approach could be significantly simpler in syntax and processing model than a more complete business-rule- or constraint-based approach.

A platform-independent format for composite web documents based on ODF archives has been presented. A composite Interactive Web Document aggregates all artifacts pertaining to document data or content, views needed to interact with or print the document, and declarative controllers for runtime behavior. IWDs extend conventional web archive formats such as the JEE WAR format by providing a REST-based protocol for interaction. The protocol maps relative URIs onto these package contents and supports a full set of CRUD operations. IWDs also extend common web archives by supporting REST services for interactive behaviors, including access to platform-independent specifications of behavior based declarative languages such as State Chart XML. In addition to REST services for digital signature operations, markup patterns are shown for both client-driven and server-controlled page navigation during document interaction.

Additional patterns for storing and managing content within an IWD can be employed on advanced digital signature use cases for collaborative business processes, on issues of access control and concurrency, and on extending the within-IWD workflow described here to encompass workflow across a composition of multiple IWDs interacting in more complex business processes. Relating to patterns for data storage and management, we can leverage the existing structure of ODF content.xml files within archives not only to store IWD metadata (for example, the currently executing page) but also to store the aggregated data or content of the IWD instance during execution. This simplifies the submission patterns for page navigation by collecting multiple XForms instances into a single XML structure within the <odf:office-body> element. In most cases, a single XForms submission could then be used both to synchronize data and effect a page transition.

Relating to issues of IWD access, an access control technology, such as, XACML, may be integrated and address issues of concurrent access by multiple actors. We recognize that realistic workflows will often be more complex than are appropriate to encapsulate in a single IWD. New levels of control extending the within-IWD notation presented may be employed. IWDs maybe composed of IWDs, i.e. hierarchical archives with IWD members in addition to leaf level artifacts. As a higher order IWD, the control mechanisms presented here should remain valid. On the other hand, we want the behavior of nested IWDs to adapt appropriately to their shared context by conforming to common styles, sharing data, and adjusting navigation appropriately to find the balance between encapsulation and visibility across IWD compositions.

Figure 7:
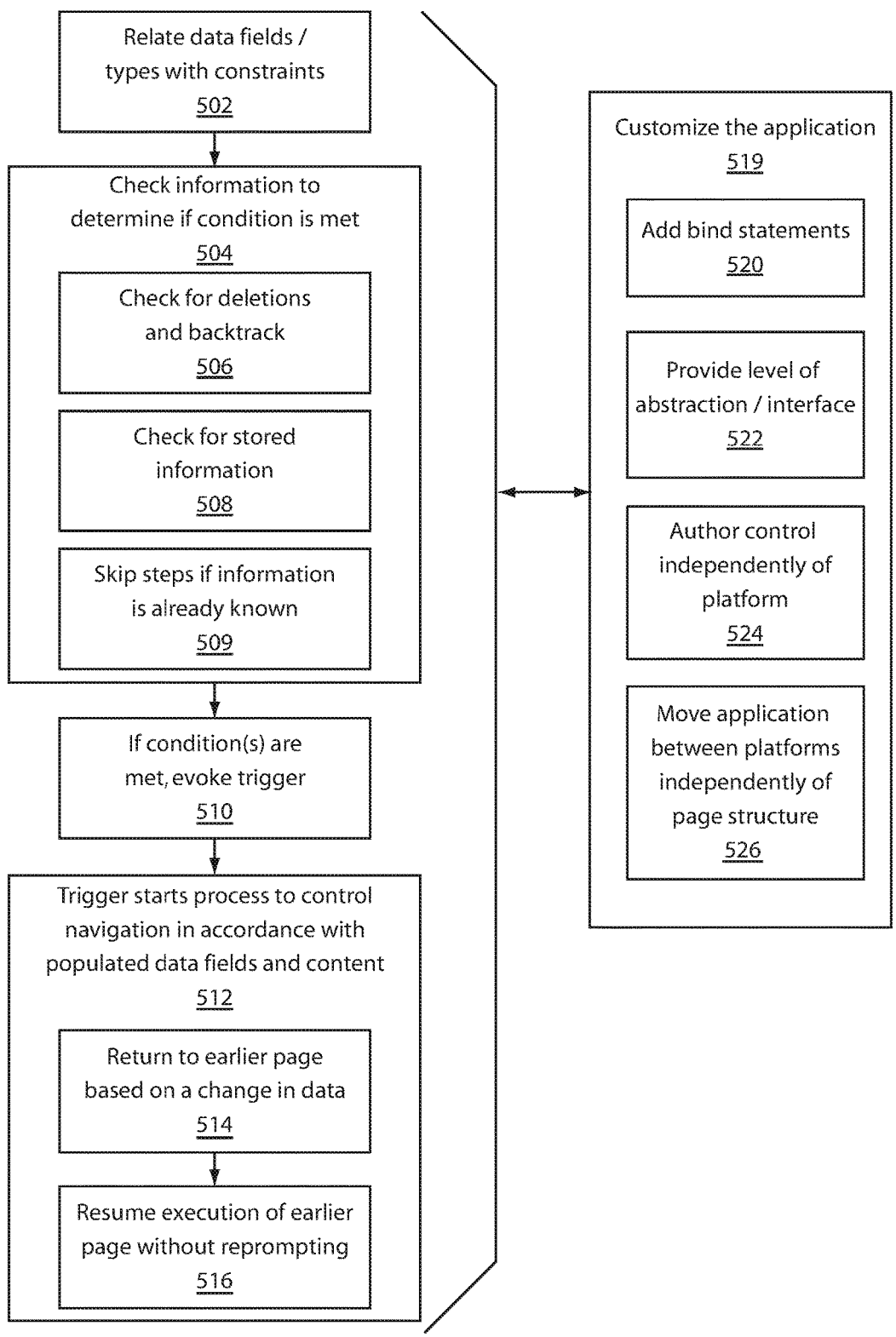
FIG. 7 is a block/flow diagram showing a system/method for web page navigation control in accordance with one illustrative embodiment.

Referring to FIG. 7, a system/method for web application navigation control is illustratively shown in accordance with one embodiment. In block 502, data entry fields and configurations in a page are related to a constraint or constraints that provide navigation control when a condition is met. The conditions may be dependent on the type of data entered, the configuration of data entered (e.g., different data fields that may be populated by a user), conditions under which data was entered, etc. The constraints may include non-procedural computed dependency constraints that may include bind constraints or other constraints that provide navigation control when a condition is met.

In block 504, presence of user-side information is checked to determine if the condition is met is and the indicated navigation control is to be invoked. This may also include determining whether data has been deleted so that the process can be reversed and the user may be prompted (e.g., navigated) back to an earlier form based upon the deletion in block 506. The user-side information may include detecting a presence of data provided by one of a user and memory storage independent of the user, in block 508. In block 509, steps may be skipped when a system determines the information is already known.

In block 510, if the condition is met, the trigger event is evoked to navigate to a new page based on at least one of a set of entry fields where data was entered and a type of data content entered in the entry fields without guidance from procedural navigation code. The procedural code would be code scripted by programmers in a navigation scheme. In other words, the data configuration or data type is employed to determine where to go next. This is in contrast to conventional system where programming code is provided to script a next move. Instead, the users actions and the availability of information are employed to navigate through pages, documents etc. In block 512, the trigger starts a process which controls navigation in accordance with a presence or absence of data values or conditions over those values. This may include controlling a sequence of web page steps during a user session.

In block 514, a return to earlier pages based upon changes to data values may be provided without need for explicit error or exception handling logic to be provided by the application author. In one embodiment, a return to an earlier page may be triggered in a flexible or unanticipated pattern based upon changes to data values. In block 516, execution of the earlier page may be resumed without reprompting for intermediate steps (but with reprompting for data values made invalid by new user inputs).

The present embodiments provide flexibility in navigation and also provide customizability by non-programmer users in block 519. In block 520, bind statements may be added without extension points to customize navigation behavior. This provides additional conditions or customizability by programmer or non-programmers alike. In block 522, a level of abstraction of application control can be provided such that non-developers are able to customize navigation behavior, e.g., using non-procedural dependency expressions (e.g., bind constructs or the like). This may include a control interface for configuring a new bind statement or other functionality to the application. In block 524, using the control interface or otherwise, navigation control can be authored which is independent of specific middleware to permit flexibly moving an application between platforms. Dependency graphs and bind constructs in accordance with the present principles are independent of the middleware platform used. In block 526, an application control application can be moved from one device to another independently of a page structure since application flow is determined by a set of data values and bind expressions in effect.

Figure 8:
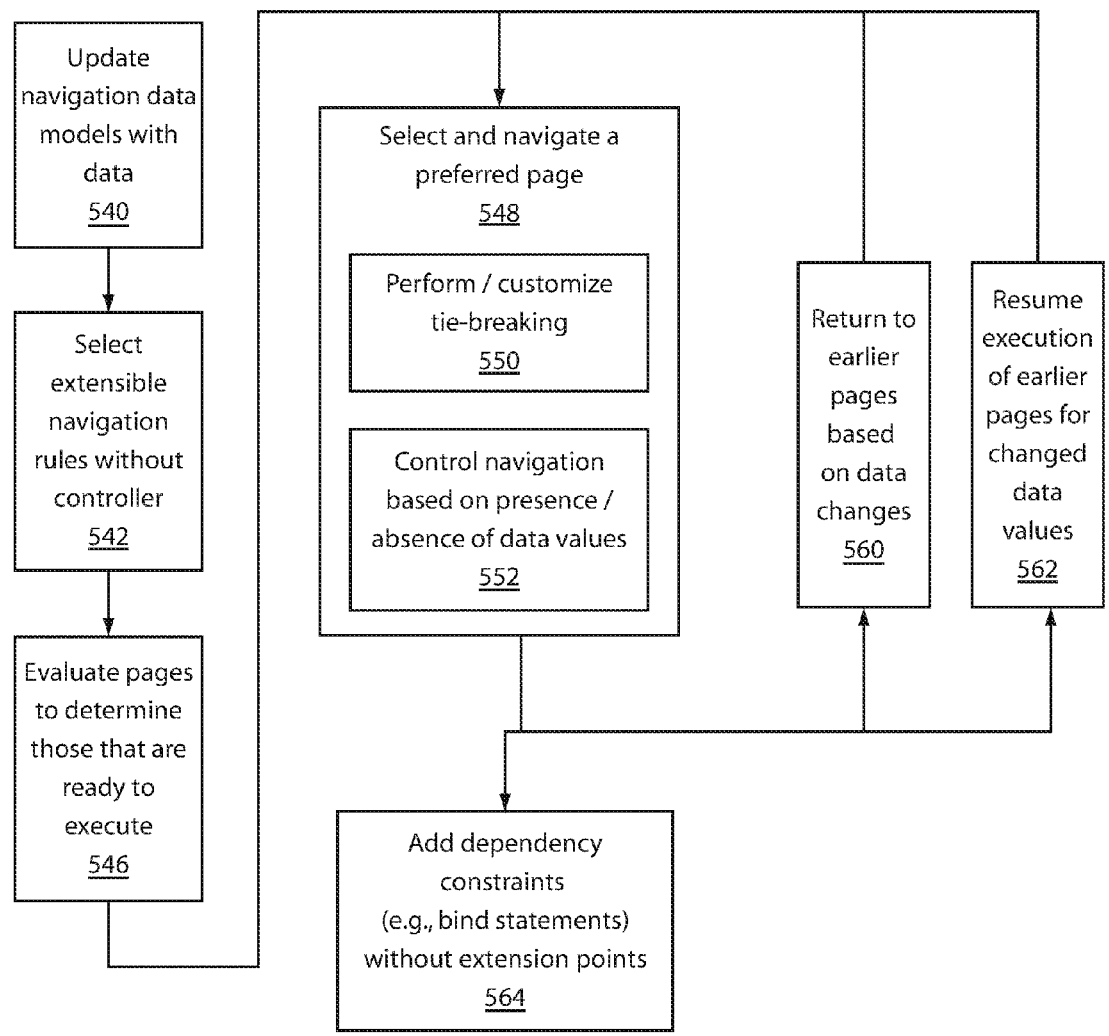
FIG. 8 is a block/flow diagram showing a system/method for web page navigation control in accordance with another illustrative embodiment.

Referring to FIG. 8, another system/method for web application navigation control is illustratively depicted. In block 540, navigation data models used in navigation constraints with received data from an end-user or system are updated. The received data from an end-user or system may include a presence of data provided by one of a user and memory storage independent of the user. In block 542, without needing a centralized application-specific controller, extensible navigation rules which depend on changed data values and need re-evaluation are automatically selected from a collection of extensible navigation rules associated with each page of a plurality of pages. In block 546, the navigation constraints associated only with the pages potentially changing their ready state to execute from among the plurality of pages in an entire application are evaluated to determine which pages are ready to run based on updated data from the navigation data models. In block 548, a preferred page to be actually navigated to next from among a set of all available and ready pages by execution of a set of second and separate navigation constraints is selected using results of the navigation constraints of the evaluating step.

In block 550, tie-breaking between pages is performed based on the navigation constraints to select a next qualified page from the set of all available and ready pages. This may be based on the amount of data the most current data or any other criteria. The tie-breaking criteria may be customized by a non-developer end-user. In block 552, selecting the pages is performed by controlling navigation in accordance with a presence or absence of data values or conditions over those values. This includes controlling a web page navigation sequence or the like.

In block 560, a return to earlier pages may be triggered based upon changes to data values without need for explicit error or exception handling logic provided by an application author. In block 562, execution of the earlier page may be resumed without reprompting for intermediate steps but with reprompting for data values made invalid by new user inputs. In block 564, data dependency constraints including bind statements may be added without need for pre-determined extension points to customize navigation behavior.

Figure 9:
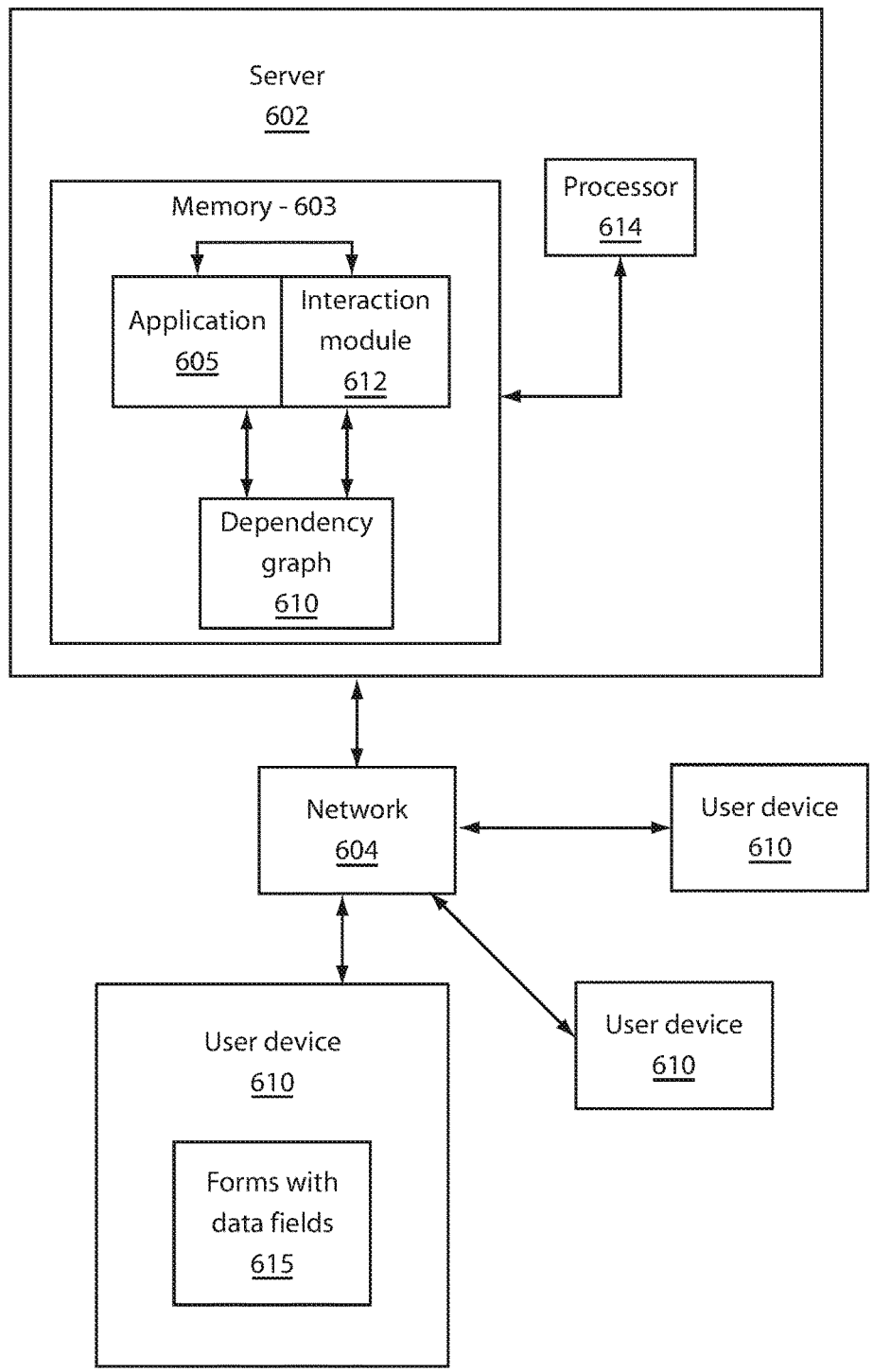
FIG. 9 is a block diagram showing a system for web page navigation control in accordance with another illustrative embodiment.

Referring to FIG. 9, a system/architecture 600 for web application navigation control is illustratively shown. A server or other computer device 602 may be located at or near a user or users or remotely from a user or users. The server 602 preferably communicates with a user(s) over a network 604. The network may include a wired or wireless network and may include a cellular network, cable network, satellite network, a telephone network etc. The server 602 includes memory 603 and at least one processor 614. An application 605 is provided, in accordance with the present principles, that permits user actions in the form of data entry type and position to automatically control navigation. The application 605 is preferably independent of an application platform and can be used with any middle-ware, for example, or with any device.

A dependency graph 606 may be provided at the server or distributed over the network 604. The dependency graph 606 relates data fields and data types with triggers and navigation controls. Web pages, forms or the like are rendered on a user's computer or other rendering device 610. Data entry fields in a page are related to navigation instructions that provide navigation control when a condition is met. For example, if three particular fields have data entered by the users, a new page is opened. In another example, if a field has a yes answer a first page is opened, and a no answer would open a different second page. Other conditions are also contemplated.

An interaction module 612 is configured to be sensitive to one of user-side information entry and known information to determine if the navigation instruction is to be invoked. The interaction module 612 uses bind instructions and the dependency graph 606 to make these determinations. The user enters data or data is entered for a user in a form 615. Depending on the fields populated, the data type, etc., determines how navigation is carried out.

A processor 614 is configured to execute the navigation instruction in accordance with a presence or absence of data values or conditions over those values to navigate to a new page based on a set of entry fields that data has been entered in and/or a type of data content entered in the entry fields without guidance from programmed navigation code. The navigation instruction controls a sequence of steps between web pages.

Having described preferred embodiments of a system and method for data-driven web page navigation control (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for web application navigation control, comprising:
   updating navigation data models used in navigation constraints with received data from an end-user or system, the data models being stored on a computer storage medium;
   without needing a centralized application-specific controller, automatically selecting from a collection of extensible navigation rules associated with each page of a plurality of pages the extensible navigation rules;
   evaluating the navigation constraints associated only with the pages potentially changing their ready state to execute from among the plurality of pages in an entire application to determine which pages are ready to run; and
   selecting a preferred page to be actually navigated to next from among a set of all available and ready pages.

2. The method as recited in claim 1, wherein selecting includes tie-breaking between pages based on the navigation constraints to select a next qualified page from the set of all available and ready pages.

3. The method as recited in claim 2, wherein tie-breaking is customized by a non-developer end-user.

4. The method as recited in claim 1, wherein selecting includes controlling navigation in accordance with a presence or absence of data values or conditions over those values.

5. The method as recited in claim 4, wherein controlling navigation includes controlling a web page navigation sequence.

6. The method as recited in claim 1, further comprising triggering a return to earlier pages based upon changes to data values without need for explicit error or exception handling logic provided by an application author.

7. The method as recited in claim 6, further comprising resuming execution of the earlier page without reprompting for intermediate steps but with reprompting for data values made invalid by new user inputs.

8. The method as recited in claim 1, wherein with received data from an end-user or system includes a presence of data provided by one of a user and memory storage independent of the user.

9. The method as recited in claim 1, further comprising adding data dependency constraints including bind statements without need for pre-determined extension points to customize navigation behavior.

10. The method as recited in claim 1, wherein the selected extensible navigation rules depend on changed data values and need re-evaluation.

11. The method as recited in claim 1, wherein determining which pages are ready to run is based on updated data from the navigation data models.

12. The method as recited in claim 1, wherein the preferred page to be actually navigated to is selected by execution of a set of second and separate navigation constraints using results of the navigation constraints of the evaluating step.

13. A method for web application navigation control, comprising:
   relating data entry fields in a page stored in computer readable storage memory with non-procedural computed dependency constraints that provide navigation control when a condition is met;
   checking a presence of user-side information to determine if the condition is met and the indicated navigation control is to be invoked; and
   if the condition is met, evoking a trigger event to navigate to a new page based on at least one of a set of entry fields where data was entered in.

14. The method as recited in claim 13, further comprising evoking the trigger event to navigate to a new page based on a type of data content entered in the entry fields.

15. The method as recited in claim 14, further comprising evoking the trigger event without guidance from procedural navigation code.

16. The method as recited in claim 13, further comprising triggering a return to earlier pages based upon changes to data values without need for explicit error or exception handling logic provided by an application author.

17. The method as recited in claim 16, further comprising resuming execution of the earlier page without reprompting for intermediate steps but with reprompting for data values made invalid by new user inputs.

18. The method as recited in claim 13, further comprising updating navigation data models used in navigation constraints with received data from an end-user or system, the data models being stored on a computer storage medium.

19. The method as recited in claim 18, wherein the navigation constraints are evaluated for navigation constraints associated only with pages potentially changing their ready state to execute from among a plurality of pages in an entire application to determine which pages are ready to run.

20. The method as recited in claim 19, further comprising selecting a preferred page to be actually navigated to next from among a set of all available and ready pages.

* * * * *